United States Patent [19]

Ims

[11] Patent Number: 4,520,368

[45] Date of Patent: May 28, 1985

[54] INK JET PRINTING METHOD AND APPARATUS

[75] Inventor: Dale R. Ims, Webster, N.Y.

[73] Assignee: Xerox Corporation, Stamford, Conn.

[21] Appl. No.: 521,851

[22] Filed: Aug. 10, 1983

[51] Int. Cl.[3] .......... G01D 15/18

[52] U.S. Cl. .......... 346/75; 346/1.1

[58] Field of Search .......... 346/75, 1.1

[56] References Cited

U.S. PATENT DOCUMENTS

| | | | |
|---|---|---|---|
| 3,465,350 | 9/1969 | Keur et al. | 346/75 |
| 3,465,351 | 9/1969 | Keur et al. | 346/75 |
| 3,555,558 | 1/1971 | Sherman | 346/75 |
| 3,737,914 | 6/1973 | Hertz | 346/75 |
| 3,828,354 | 8/1974 | Hilton | 346/1 |
| 4,050,075 | 9/1977 | Hertz et al. | 346/75 |
| 4,178,595 | 12/1979 | Jinnai | 346/140 R |
| 4,238,804 | 12/1980 | Warren | 346/75 |
| 4,258,370 | 3/1981 | Paranjpe | 346/75 |
| 4,259,696 | 3/1981 | Paranjpe et al. | 358/256 X |
| 4,293,863 | 10/1981 | Davis et al. | 346/75 |
| 4,310,845 | 1/1982 | Tsao | 346/1.1 |
| 4,313,684 | 2/1982 | Tazaki et al. | 400/322 |
| 4,321,607 | 3/1982 | Heibein | 346/75 |

*Primary Examiner*—E. A. Goldberg
*Assistant Examiner*—Gerald E. Preston
*Attorney, Agent, or Firm*—Robert A. Chittum

[57] ABSTRACT

An ink jet printing method and apparatus having an oscillating printing bar with multiple nozzles. The nozzles emit continuous streams of ink droplets which are charged and deflected to the recording medium or the gutter for recirculation. The recording medium moves at a constant velocity in a direction perpendicular to the direction of oscillation by the printing bar and travels in a single-pass, straight-through path past the printing bar. The ink droplets are deflected in the direction of movement of the recording medium for a predetermined height of one character. This enables the printing bar to print swaths one character high and for the full width of the recording medium for each half cycle of printing bar oscillation. The normal scan length for each half cycle is the distance between adjacent nozzles in the printing bar. Omni-font capability is provided by the printer controller which can overscan the printing bar in one direction without overlapping printing by adjacent nozzles.

8 Claims, 5 Drawing Figures

CONTROLLER
INPUT
D/A
D/A
D/A
D/A
D/A
D/A
INK RESERVOIR
-V
+V
1
2
3
4
5
6
7
8
9
10
11
12
14
16
19
20
21
22
23
24
25
26
27
28
29
30
31
32
33
34
35
36
37
38
39
39A

INK JET PRINTING METHOD AND APPARATUS

FIELD OF THE INVENTION

The present invention relates to method and apparatus for printing with an ink jet device and more particularly to such method and apparatus which employ an oscillating ink jet printing bar having multiple nozzles for directing ink droplets towards a moving ink receiving substrate, which substrate moves constantly during printing thereon.

DESCRIPTION OF THE PRIOR ART

U.S. Pat. Nos. 3,465,350 and 3,465,351 to R. I. Keur et al. and U.S. Pat. No. 3,555,558 to Sherman disclose ink droplet printing devices in which an ink nozzle is moved perpendicularly to the movement of a web. Ink droplet placement is controlled by an electric field and unnecessary drops are deflected to a waste reservoir. Circuitry is provided to ensure that the droplets are charged in phase with data or video signals and that carriage motion variables are corrected to ensure a uniform margin.

U.S. Pat. No. 3,737,914 to Hertz discloses a multi-jet printer whose printing head is moved from side-to-side, while the recording mechanism is moved in a direction perpendicular to that of the head movement. U.S. Pat. No. 4,050,075 to Hertz et al. discloses an ink jet writing system mounted on a traveling carriage, the carriage and recording medium being selectively moved to effect relative movement between them.

U.S. Pat. No. 4,178,595 to Jinnai et al. and U.S. Pat. No. 4,313,684 to Tazaki et al. disclose ink jet printers with oscillating print heads but are of the type which use drops-on-demand rather than print heads which emit continuous streams of ink that are concurrently broken into droplets and charged for deflection by an electrostatic field to the proper location on a receiving surface or to a gutter for recirculation.

U.S. Pat. No. 4,293,863 to Davis et al. discloses a printing device having an oscillating print head with a plurality of ink emitting nozzles and a recording medium that is mounted on a rotatable drum. The printing head is moved in either direction at a uniform velocity parallel to the area of rotation of the drum, thus printing along helical print lines or the print head may be moved a discrete distance after each rotation of the drum such that the print lines are circumferential. Several revolutions of the drum are necessary to print a line

SUMMARY OF THE INVENTION

It is the object of the invention to provide full page width printing capability by an ink jet method and apparatus utilizing an oscillating multi-jet printing bar which prints one line of characters per half-cycle of oscillation.

It is another object of the invention to minimize the number of jets in the printing bar without sacrificing print quality.

It is a further object of the invention to use a constant-velocity, moving ink receiving medium which has a single pass, straight through path of travel which provides complete page coverage without areas not capable of receiving ink droplets and without areas which have overlapping printing.

In the present invention, an ink jet device of the type having multiple, continuous streams of droplets directed to a constant-velocity, moving ink receiving medium from a plurality of nozzles in an oscillating printing bar is utilized. A complete line of characters or fonts are printed during one direction of movement of the printing bar and a second complete line of characters are printed on the return movement of the printing bar. The distance of movement in one direction of the printing bar is generally equal to the spacing between nozzles, but where special fonts or indicia are required, an additional length of movement is provided to prevent the need of close tolerances between droplet target areas on the recording medium of two adjacent nozzles. This enables all fonts to be entirely printed by one nozzle. The nozzle spacing, however, is generally that necessary to accommodate the maximum width of standard alpha numeric characters.

The direction of movement of the printing bar is perpendicular to that of the direction of movement of the recording medium. The droplets are charged and deflected by an electric field in a direction of movement of the recording medium and for a height of the desired characters to be printed. The unused droplets are directed to a gutter for recirculation and reuse. The droplets are charged in accordance with input signals from a controller representing the information to be printed. The controller controls the charges induced on each droplet and the predetermined charges causes the droplets, as they move through the electric field set up by a pair of deflection plates, to be deflected to specific locations on the moving recording medium, referred to hereinafter as pixels. By compensating for the travel distance of the recording medium in addition to the electrostatic and aerodynamic influences on the droplets, a full page width area, an appropriate number of pixels high, is addressable as the oscillating printing bar moves in one direction for generally the distance between of the spacing between nozzles.

The foregoing features and other objects will become apparent from a reading of the following specification in connection with the drawings.

DESCRIPTION OF THE PREFERRED EMBODIMENT

Figure 1:
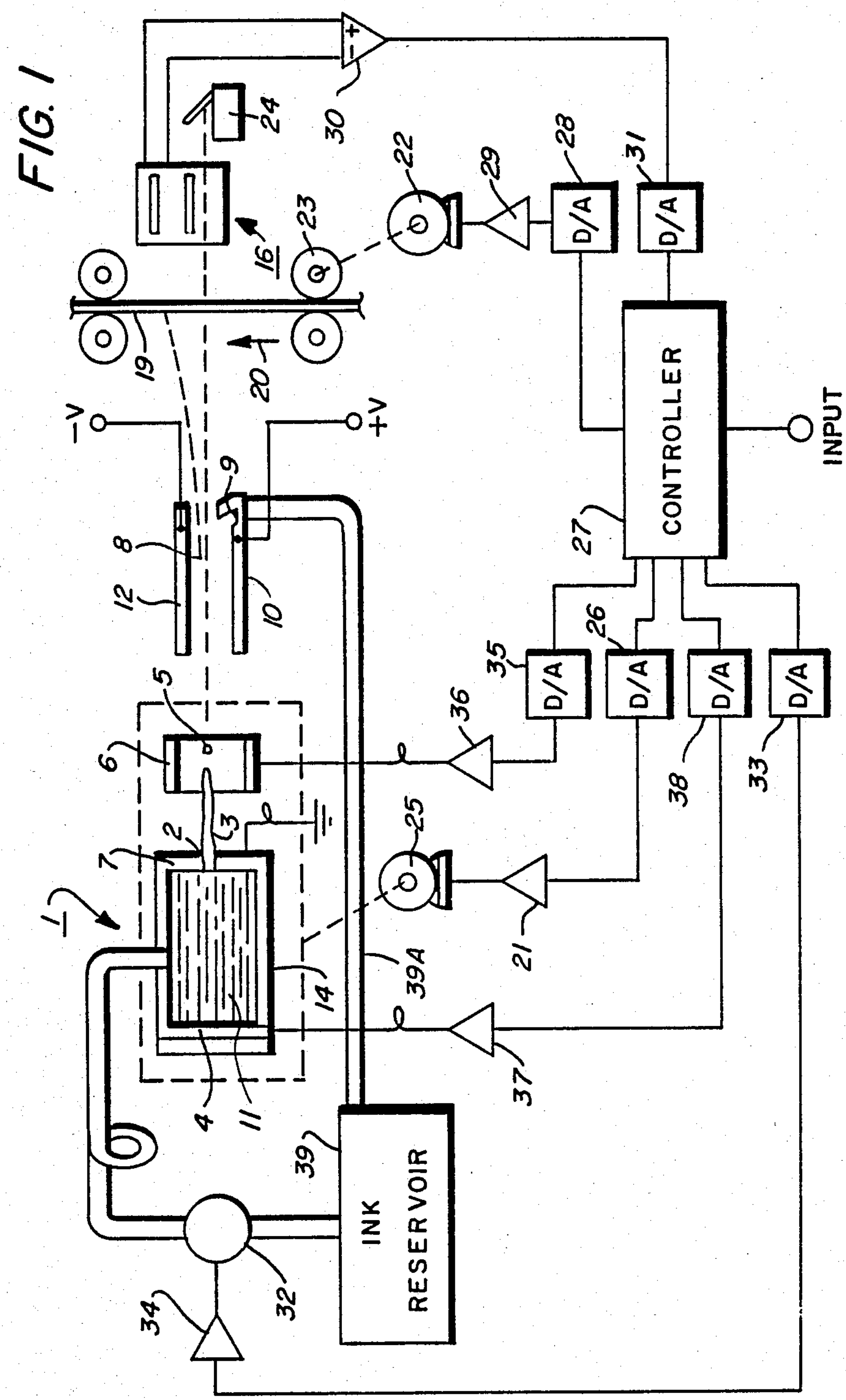
FIG. 1 is a side elevation view in schematic form of an ink jet printer according to the present invention.

The pictorial ink jet printer of FIG. 1 includes an oscillating printing bar 1 shown in dashed lines which comprises an ink manifold 7 having a plurality of nozzles 2 through which fluid ink 11 is emitted under pressure creating a continuous stream 3 of the ink from each nozzle. A piezoelectric device 4 coupled to a wall of the manifold 7 periodically stimulates the ink with a pressure wave which promotes the formation of droplets 5 adjacent a charging electrode 6. The ink is conductive, so that voltage applied to the charging electrode at the moment of drop formation, results in a droplet 5 having a charge proportional to the applied voltage.

The charged droplets are deflected by deflection plates 10 and 12 in the plane of FIG. 1 or in the direction of movement of the recording medium 19 as depicted by arrow 20. The deflection plates 10, 12 have a high electrostatic field between them established by + and − voltage potentials. Typically, the charging voltages applied to charging electrode 6 are in the range of 10 to 200 volts, while the potential difference between the deflection plates 10, 12 is in the vicinity of 2000–3000 volts. The droplets not directed to the recording medium are directed to gutter 9. The gutter directed droplets may be charged or uncharged, as a design choice, but in FIG. 1 the uncharged droplets follow the straight line trajectory 8 to the recording medium.

A pair of sensors 16 for each nozzle operate in a position servo loop to adjust the charge needed to locate a stream of droplets directly adjacent the sensors. The charge needed to align the droplets to the sensor pair is then known. The droplet vertical deflection process is substantially linear. Therefore, the droplets from a given nozzle can be positioned accurately within its vertical range to all droplet target areas on the recording medium, hereinafter referred to as pixels. In the preferred embodiment, the vertical height of droplet deflection is that number of pixels 13 required to print a selected character or font. For purposes of illustration, eight pixels are used for the vertical height in FIG. 2.

Figure 2:
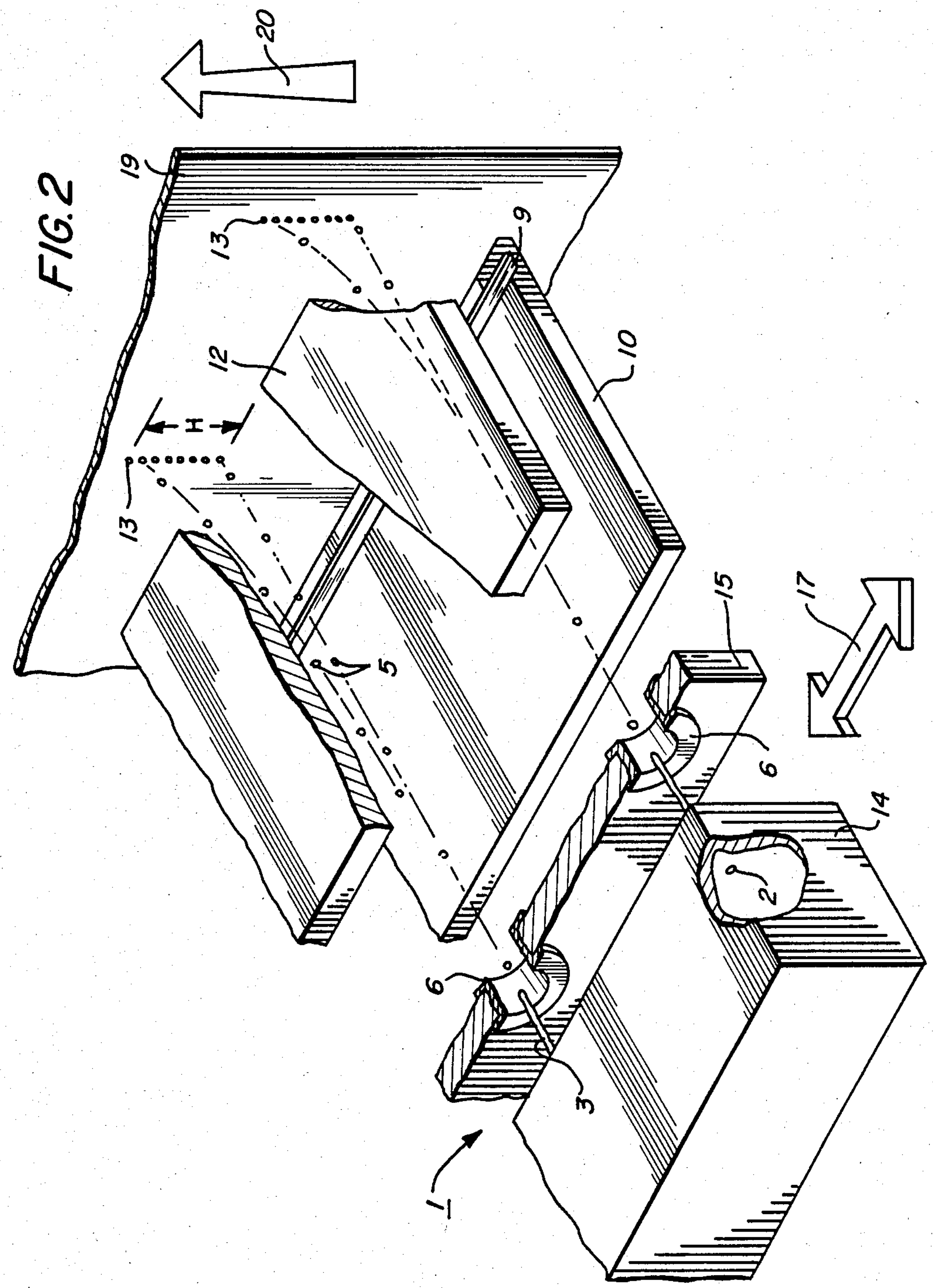
FIG. 2 is a partial perspective view of a schematical representation of the ink jet printer in FIG. 1.

Referring to FIG. 2, the charged droplets 5 from each nozzle 2 form a vertical trace height or deflection bandwidth H that is composed of a column of pixels 13. The columns of pixels for the example shown include eight pixels that are to be marked with droplets from a given nozzle. The actual droplets are about 0.035 mm in diameter and spread to a spot of about 0.05 mm when they impact the recording medium 19, such as, for example, paper. Each pixel 13 represents a 0.05 mm circular spot.

A full-width, elongated printing bar 1 has about 20 uniformly spaced nozzles 2 along its length, with the nozzles aimed towards the recording medium 19. The printing bar is positioned so that its length is transverse to the direction of movement of the recording medium and parallel to the confronting surface of the recording medium. The printing bar 1 oscillates in the direction of the length, which direction is substantially perpendicular to the direction of movement of the recording medium, as depicted by arrow 20. The direction of oscillation is depicted by arrow 17. The length of oscillation in one direction (a half cycle) is generally that of the spacing between nozzles or about 0.4 inches for recording mediums 8½ inch wide. Therefore, when the printing bar is oscillated in one direction, a swath or stripe that has a height H may be printed for the full width of the moving recording medium. The droplet generator 14 of the printing bar 1 comprises the manifold 7, piezoelectric device 4 and nozzles 2 and is positioned together with the charging electrodes 6 in the printing bar. The printing bar is slidably mounted in the ink jet device of the present invention by means well known in the art to permit oscillation thereof by drive means 25 in response to signals from the controller 27 through digital to analog (D/A) converter 26 and amplifier 21. The printer is designed to record information on the moving recording medium 19, which travels at a constant velocity in the direction of arrow 20. The relative movement of the recording medium in combination with the oscillating movement of the printing bar in one direction produce an addressable pixel coverage equal to a swath or stripe on the recording medium across the full width of the recording medium and with the height H, shown for illustration purposes as mentioned above, to be eight pixels high. This swath of available pixels may be printed during each direction of movement by the printing bar during its back and forth motion or oscillation, so that one round trip (full cycle) movement of the printing bar prints two swaths.

The recording medium is moved at a constant velocity during ink jet printing by motor 22 coupled to drive means 23. The sensors 16 are located downstream from the recording medium so that the streams of droplets 5 from the nozzles 2 can pass adjacent the vertically oriented, calibration sensors 16 when the recording medium is out of the way. A second gutter 24 is located downstream of the sensors to catch the droplets during the calibration mode.

The system of FIG. 1 makes blank marks on the recording medium, for example, white paper, in response to electrical information signals. The information or video signals are applied to the controller 27 which is a microprocessor such as the model 6800 sold by the Motorola Corporation. Video signals representative of an image are stored, for example, in designated memory locations within the controller.

The controller also includes output ports that issue electrical control signals to the various system components. A digital to analog (D/A) converter 28 and amplifier 29 couple the controller to the recording medium drive means motor 22. Under the direction of the controller, the recording medium is moved during the printing process at a constant velocity past the oscillating printing bar whereat streams at ink droplets 5 are directed to specific pixel locations on the recording medium. Prior to the arrival of the recording medium, during a calibration mode, or after the recording medium has passed the vicinity of the droplet streams, the nozzles issue a series of streams to align the droplets to the sensors 16.

Each pair of sensors communicate with the controller 27 via a differential amplifier 30 and an analog to digital (A/D) converter 31. The sensors are used to align the droplet streams. The controller adjusts the voltage applied to the charging electrode until the desired alignment is achieved. The voltage value that achieved alignment is stored in the memory of the controller. The voltage signals to the charging electrodes 6 is applied via D/A converter 35 and amplifier 36 by means well known in the art to convert video signals to droplet charge signals and concurrently compensate such charge signals for aerodynamic and electrostatic effects. Refer to, for example, U.S. Pat. No. 3,838,354 to Hilton.

The controller 27 also includes an output to drive the piezoelectric device 4 that promotes the drop formation. The piezoelectric device is driven at a frequency that gives rise to droplet generation rates in the vicinity of about 100 to about 125 kilohertz (KHz). The amplifier 37 and D/A converter 38 couple the piezoelectric device and the controller together.

A conduit 39A connects the gutter 9 to the ink reservoir 39 to permit the unused ink to be recycled. Another conduit (not shown) connects the gutter 24 used for ink droplet calibration to the ink reservoir for recycling the ink received by this gutter.

The droplet velocities are also controlled by the controller 27 by increasing or decreasing the fluid pressure in manifold 7 by the pump 32. The signal to the pump from the controller is via D/A converter 33 and amplifier 34.

The pair of sensors 16 operate in a position servo loop to adjust the charge needed to locate a droplet stream directly beside the sensors in a manner similar to that disclosed in U.S. Pat. No. 4,238,804 to Warren. The charge needed to center or align the drops to the pair of sensors is then known. The drop deflection process is substantially linear. Therefore, the droplets from a given nozzle can be positioned accurately to all pixels within its range.

In FIG. 2, both the droplet generator 14 and upper deflection plate 12 are shown in schematic form with sections partially removed dashed line for clarity. The charging electrode 6, which is fixed relative to the drop generator, is shown with the upper half removed to better show the trajectories of the streams of droplets 5 from the two representative nozzles 2. The trajectories to the upper and lowermost pixels in the column of pixels is diagrammatically depicted by dashed lines to show the vertical deflection of the droplets as they are directed to the recording medium. The droplets not targetted for the recording medium are, of course, directed to gutter 9.

Figure 3:
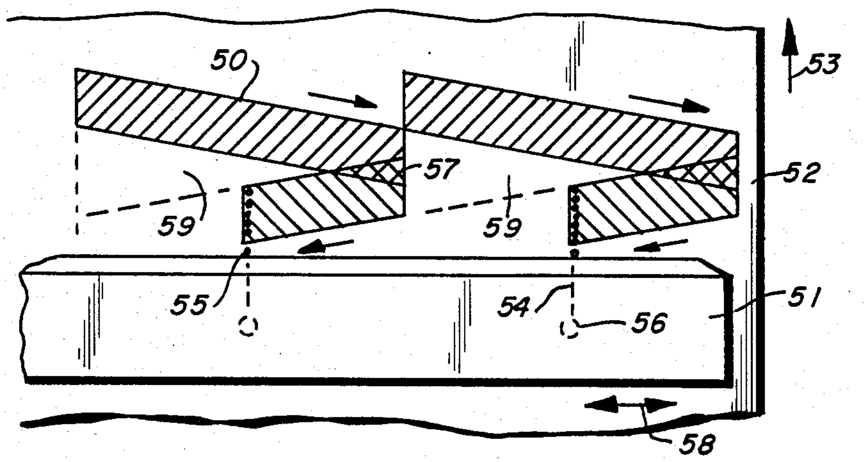
FIG. 3 is a schematical representation of a prior art oscillating ink jet printing bar, depicting the swaths of printing thereby on a moving recording medium.

FIG. 3 shows the printing swaths 50 of a prior art ink jet printer having an oscillating printing bar 51 and a constant velocity moving recording medium 52 which moves in direction of arrow 53. The oscillation of the printing bar is transverse to that of the direction of movement of the recording medium 52 and is depicted by arrow 58. The trajectories 54 of the streams of ink droplets 55 from nozzles 56 produce swaths of ink droplet coverage that overlap at areas 57 when the printing bar 51 reverses its direction. Other areas at 59 are totally missed and unaddressable by the printer.

Figure 4:
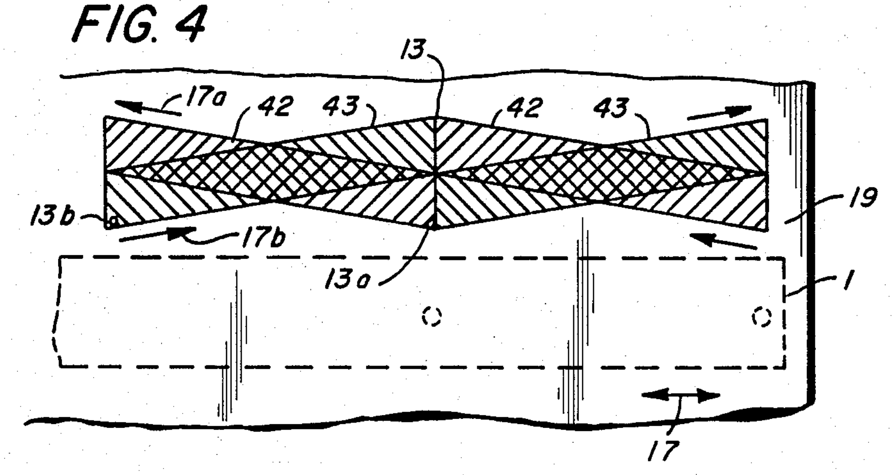
FIG. 4 is a schematical representation of the oscillating ink jet printing bar of FIG. 1, depicting swaths of printing thereby when the recording medium is held stationary.

As shown in FIG. 4, the printing bar 1 of the present invention oscillates in the direction of arrow 17. The swaths 42 of pixels 13 addressed by the printing bar 1 have had their trajectories further modified by the controller 27, shown in FIG. 1, to compensate for the movement of the recording medium 19. The recording medium is shown stationary in FIG. 4 to show that the adjacent nozzles would not print a horizontal swath. To the contrary, when the recording medium is held stationary, the vertical deflection of the ink droplets rise and each time they reach the top pixel in a particular column of pixels 13, the droplets are diverted to the lower most pixel in the next succeeding adjacent column. As the printing moves to the left in the direction of arrow 17*a*, the swath 42 in that direction is slanted upwardly. The slanted swath is printed because the lowermost pixel in the next succeeding column of pixels is higher than the preceeding lowermost pixel in the adjacent column of pixels. When the printing bar 1 reverses itself to move in the opposite direction 17*b*, the lowermost pixel to be addressed by the first ink droplet is dropped to the pixel 13*b* having the same height above the printing bar as that of the first pixel 13*a* addressed during the direction 17*a* of movement by the printing bar. Therefore, the return stroke of the printing bar (arrow 17*b*) would produce the swath 43 which is slanted in the opposite direction to that of swath 42. The result of the overlapping swaths printed by each nozzle produce a form which resembles a flattened letter "X".

Figure 5:
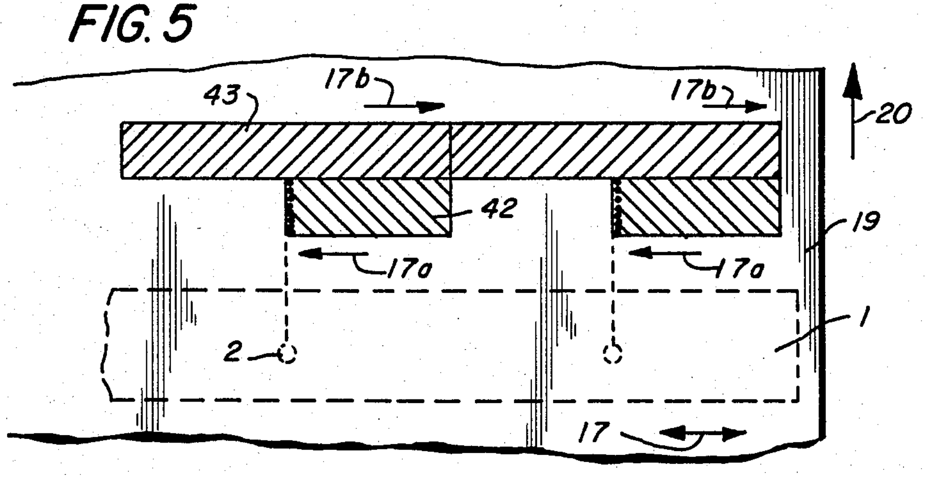
FIG. 5 is a schematical representation of the oscillating ink jet printing bar of FIG. 1, depicting swaths of printing thereby on a recording medium moving at a constant velocity.

When the printing described with reference to FIG. 4 is done during the normal printing mode with the recording medium moving at a constant velocity as depicted in FIG. 5, the swaths 42 and 43 are contiguous along their adjacent edges and parallel with each other. Thus, it is clear that a full page width may be printed without overlap or missed areas.

Since the height H of the swath printed by each nozzle is one character high, each character may be printed entirely by a single nozzle so the close tolerance nozzle-to-nozzle interface printing, commonly referred as switching, is not required. For multi-font and proportional spacing capability, the printing bar 1 may be moved by the controller 27 beyond its normal side-to-side movement to overscan by an amount equal to the maximum desired character width. Thus, when the characters for a given line happens to fall on the interface between swaths, the controller causes the printing bar to overscan and print the entire character. The droplets from the adjacent nozzles normally scheduled for that portion of the recording medium are sent to the gutter by the controller to prevent overlapping printing when the oversized fonts are encountered. With this overscanning capability, different fonts, including those with proportionally spaced characters, may be printed without the critical nozzle-to-nozzle stitching accuracy that would be required, if some characters were printed in segments by each of two adjacent nozzles.

In recapitulation, the present invention utilizes an ink jet printer having an oscillating, multi-nozzle printing bar to print on a recording medium, such as paper. The recording medium moves at a constant velocity and through the ink jet printer in a single-pass, straight-through path of travel. The ink printer is the type having continuous streams of droplets issue from each nozzle and the droplets not to be placed on the recording medium are directed to a gutter for recirculation to the ink supply reservoir. The ink droplets are charged by charging electrodes in accordance with data signals from a controller to place the appropriate charge on each droplet for deflection by the electrostatic field as the droplets pass therethrough on the way towards the recording medium. The droplets are accurately placed in specific locations on the recording medium or directed to the gutter. The controller adjusts the voltage applied to the charging electrodes to compensate for electrostatic and aerodynamic effects in accordance with prior art techniques, but also further compensates for the constantly moving recording medium. The deflection of the ink droplets by the deflection electrodes is vertically or in the direction of the movement of the recording medium and for the number of droplets required to produce a column of droplets or pixels having a height equal to the largest character to be printed. The combination of oscillation of the printing bar in a direction perpendicular to that of the direction of movement of the recording medium and the constant velocity movement of the recording medium, allows the printing bar to print swaths parallel to the printing bar all the way across the full width of the recording medium having a height of one character. This enables a character to be entirely printed by one nozzle without the tight stitching tolerances required of some prior devices. To enable the inventive printing process and apparatus to have multi-font or proportional spacing capability, the controller overscans the printing bar so that any font falling between the swaths produced by adjacent nozzles may be printed by a one of the selected nozzles. The controller prevents overlapping printing by adjacent nozzles when overscanning is required.

Many modifications and variations are apparent from the foregoing description of the invention and all such modifications and variations are intended to be within the scope of the present invention.

I claim:

1. A method of printing with an ink jet printer having an elongated, oscillating, multi-nozzle printing bar, the ink jet printer being of the type having continuous streams of ink droplets emitted therefrom, the method comprising the steps of:

(a) moving an ink receiving substrate in one direction past the printing bar at a constant velocity;

(b) oscillating the multi-nozzle printing bar along its length and in a direction transverse to the direction of movement of the substrate, the nozzles in said printing bar being equally spaced along the length thereof and confronting the substrate;

(c) directing the ink droplets emitted from the nozzles to the substrate or to a gutter for recirculation in response to signals from a controller for the ink jet printer;

(d) deflecting the ink droplets directed to the substrate in the direction of movement of the substrate for a predetermined height and then continually repeating this deflection; and (e) adjusting the deflection of the ink droplets to compensate for the movement of the substrate as well as for electrostatic and aerodynamic affects, so that the combination of said directing of the ink droplets in step (c) and adjustment of the deflecting of the ink droplets in step (d), together with a half-cycle of oscillation of the printing bar may produce printed areas across the full width of the substrate having the predetermined height that are substantially parallel to said printing bar and are devoid of printing gaps and overlaps.

2. The method of claim 1 wherein the predetermined height of the ink droplets per half-cycle is equal to a character to be printed, so that each nozzle is capable of printing an entire character and thus eliminate the close tolerances required between printing interfaces of adjacent nozzles when a character must be printed at this interface by the two adjacent nozzles.

3. The method of claim 1 wherein the half cycle of oscillation is approximately equal to the distance between nozzles in said printing bar.

4. The method of claim 3 wherein the half cycle distance of oscillation may be increased by the controller to provide the capability of multi-font and proportionally spaced character printing without requiring more than one nozzle to print any one character.

5. The method of claim 3 wherein the controller prevents overlap printing between nozzles when said controller increases the oscillation distance of a half-cycle by directing the droplets from adjacent nozzles that would be overscanned to said gutter.

6. An ink jet printer of the type having an elongated, oscillating printing bar with a plurality of nozzles linearly disposed therealong and having continuous streams of ink droplets expelled from the nozzles, the printed bar being adapted for printing across the full width of a recording medium which travels a single-pass straight-through path by the printing bar with a constant velocity, the ink jet printer comprising:

(a) means for supplying ink under pressure to the nozzles so that streams of ink injected therefrom;

(b) means for perturbing the ink streams to cause them to break up and form into droplets of a predetermined distance from the nozzles;

(c) means for charging the droplets at the point of formation by a controller;

(d) means for deflecting the charged droplets as they move towards the recording medium to direct them to a specific location on the recording medium or to a gutter for recirculation and reuse, the deflecting means being adapted to scan the droplets from each nozzle in the same direction as the movement of the recording medium and for a predetermined distance in that direction;

(e) means for oscillating the printing bar in a direction along its length and in a direction transverse to that of the path of travel by the recording medium, the distance of movement in one direction of oscillation or half cycle being that of spacing between nozzles; and (f) means for adjusting the charge placed on the droplets by said charging means to compensate for the movement of the recording medium, so that the full width of said recording medium may be printed without overlapping and without voids.

7. The printer of claim 6, wherein nozzles are equally spaced along the printing bar; and wherein the predetermined height of the scan of the droplets is that for one character, so that any character may be printed entirely by one nozzle without the need for close stitching tolerances necessary when a character is printed from the droplets of two adjacent nozzles.

8. The printer of claim 7, wherein the half cycle distance traveled by the printing bar in one direction may be selectively increased by the controller to provide the capability of multi-font and proportionally spaced character printing, so that one nozzle always prints a complete font, when the increased distance for a half cycle is instituted, the droplets from the adjacent nozzle normally scheduled for this area are directed to the gutter to prevent overlapping of droplets on the recording medium.

* * * * *